US010962143B2

(12) United States Patent
Cis et al.

(10) Patent No.: US 10,962,143 B2
(45) Date of Patent: Mar. 30, 2021

(54) SERVOVALVE (71) Applicant: Hamilton Sundstrand Corporation, Charlotte, NC (US)

(72) Inventors: Marcin Cis, Lutynia (PL); Piotr Sawicki, Bogdaniec (PL)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/433,405

(22) Filed: Jun. 6, 2019

(65) Prior Publication Data
US 2020/0025309 A1 Jan. 23, 2020

(30) Foreign Application Priority Data
Jul. 20, 2018 (EP) ..................... 18461586

(51) Int. Cl.
F16K 49/00 (2006.01)
F16K 31/06 (2006.01)
(Continued)

(52) U.S. Cl.
CPC ............ *F16K 49/005* (2013.01); *F16K 31/06* (2013.01); *F16K 31/0627* (2013.01); *F16K 31/0682* (2013.01); *F28F 13/06* (2013.01); *F15B 13/0438* (2013.01); *F15B 2211/62* (2013.01); *F28F 2250/102* (2013.01); *F28F 2270/00* (2013.01)

(58) Field of Classification Search
CPC .... F16K 49/005; F16K 31/06; F16K 31/0627; F16K 31/0682; F28F 13/06; F28F 2250/102; F28F 2270/00; F15B 2211/62; F15B 12/0438
See application file for complete search history.

(56) References Cited

U.S. PATENT DOCUMENTS 2,889,815 A * 6/1959 Lloyd ................. F15B 13/0431
                                                            91/420
2013/0199615 A1* 8/2013 McHugh ............ G05D 23/1917
                                                            137/1
(Continued)

FOREIGN PATENT DOCUMENTS

CN    103615431 A    3/2014
EP    0387533 A2     9/1990
(Continued)

OTHER PUBLICATIONS

European Search Report for Application No. 18461586.2-1010, dated Jan. 28, 2019, 13 pages.

Primary Examiner — Jessica Cahill
Assistant Examiner — Patrick C Williams
(74) Attorney, Agent, or Firm — Cantor Colburn LLP (57) ABSTRACT The present disclosure provides a heat exchanger system for a servovalve, comprising a base comprising a supply port in fluid communication with a return port, a first passage for fluid connection to a source of cooling fluid, and a second passage in fluid communication with the return port. The system further comprises one or more pipes located over a surface of the base, the one or more pipes fluidly connected between the first passage and the second passage, such that in use cooling fluid may flow from the first passage to the second passage via the network of pipes.

12 Claims, 6 Drawing Sheets (51) Int. Cl.
    *F28F 13/06*     (2006.01)
    *F15B 13/043*     (2006.01)

(56) References Cited

U.S. PATENT DOCUMENTS

| 2013/0292391 | A1* | 11/2013 | Dala | E04F 13/0803 |
| | | | | 220/592.2 |
| 2015/0192218 | A1* | 7/2015 | Arend | H02K 26/00 |
| | | | | 137/625.4 |
| 2016/0208694 | A1* | 7/2016 | Simpson | F04B 53/10 |

FOREIGN PATENT DOCUMENTS

| EP | 3045709 A1 | 7/2016 |
| FR | 2980250 A1 | 3/2013 |
| JP | 06235404 A | 8/1994 |
| WO | 0034119 A1 | 6/2000 |

* cited by examiner

SERVOVALVE

FOREIGN PRIORITY

This application claims priority to European Patent Application No. 18461586.2 filed Jul. 20, 2018, the entire contents of which is incorporated herein by reference.

FIELD

The present disclosure relates generally to a servovalve, and in particular to a pneumatic servovalve for an aircraft in which a cooling system is employed to isolate the torque motor of the servovalve from high temperatures, for example those that may be received from the supply port of the servovalve.

BACKGROUND

Figure 1:
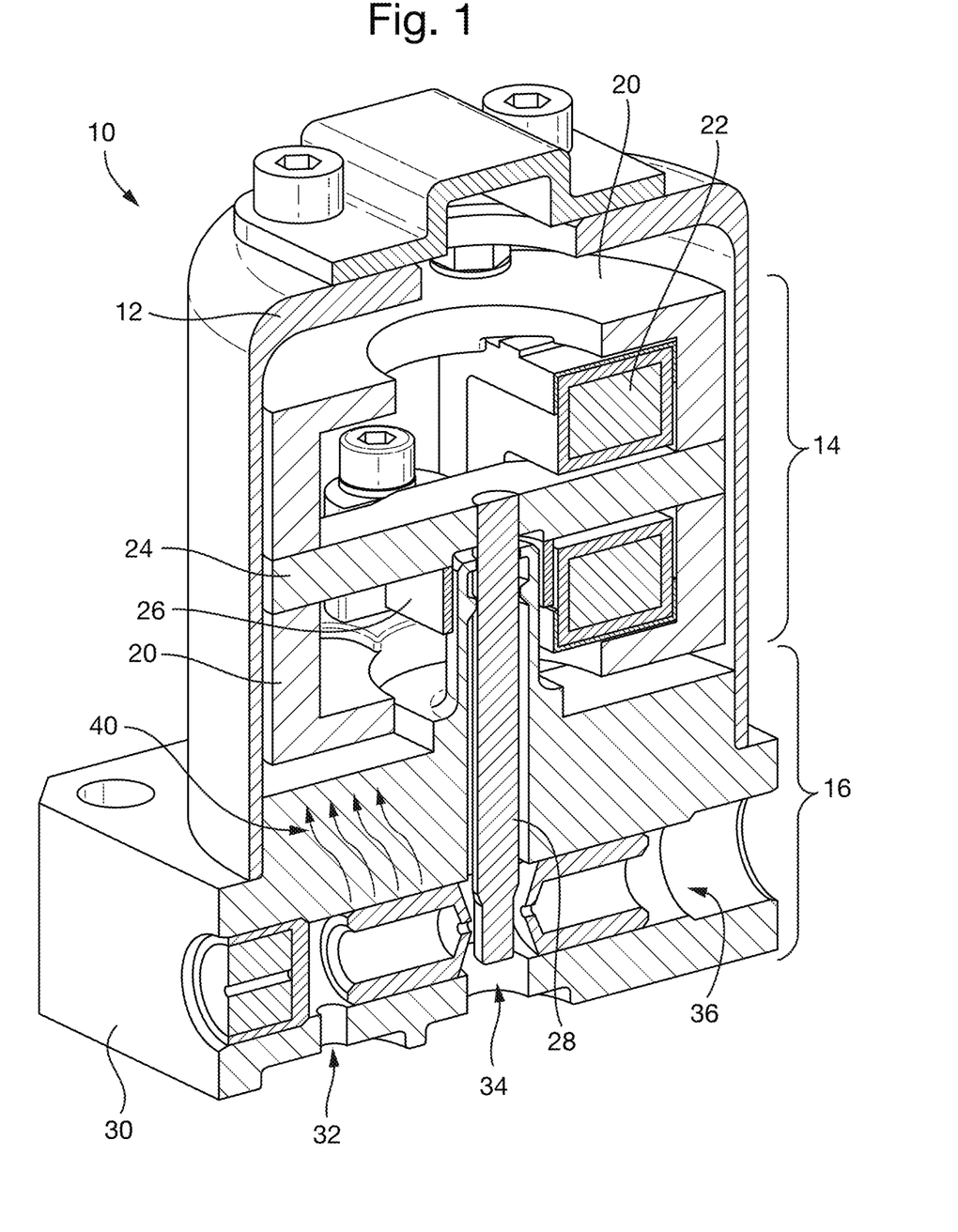
FIG. 1 shows a conventional arrangement for illustrative purposes only.

FIG. 1 shows a conventional servovalve 10, which may comprise a housing 12, a torque motor 14, and a pneumatic section 16.

The illustrated torque motor 14 is a conventional pneumatic torque motor, comprising upper and lower permanent magnets 20, electromagnetic coils 22 and an armature 24. The armature 24 is held in place using a torsion bridge 26, which acts to bias the armature 24 to its resting position as shown in FIG. 1. As is known in the art, upon application of electrical current to the electromagnetic coils 22, the armature is moved or displaced from its resting position, which movement causes a flapper 28 to move or rotate.

The pneumatic section 16 of the servovalve 10 comprises a base 30, which comprises a supply port 32, a control port 34 and a return port 36 for pneumatic fluid. Movement of the flapper 28 as described above causes the pneumatic fluid (e.g., air) to move through the pneumatic section 16 from the supply port 32 to the return port 36.

The pneumatic fluid entering the base 30 of the servovalve 10 is typically very hot, such that the temperature of the supply fluid may be significantly higher than ambient temperature. As such, heat may be transferred from the pneumatic fluid to the torque motor 14 via part of the base 30, as indicated by arrows 40.

It is desired to reduce the impact of heat transfer from the pneumatic section 16 to the torque motor 14 of the servovalve 10.

SUMMARY

In accordance with an aspect of the disclosure, there is provided a heat exchanger system for a servovalve. The system includes a base comprising a supply port in fluid communication with a return port, a first passage for fluid connection to a source of cooling fluid, and a second passage in fluid communication with the return port. The system also includes one or more pipes located adjacent a surface of the base, the one or more pipes fluidly connected between the first passage and the second passage, such that in use cooling fluid may flow from the first passage to the second passage via the one or more pipes.

The above construction insulates the base of the servovalve and can provide improved cooling for any components that are positioned above (e.g., adjacent to and/or over) the one or more pipes (e.g., the one or more pipes may be located between the base and the components).

The one or more pipes may be located near to and/or across the surface of the base, such that they are spread over the surface and in close proximity thereto. The surface may be a substantially flat surface configured to support one or more components of a torque motor (e.g., as described below).

A portion of the pipe or pipes may comprise a substantially flat layer of piping that is spread across the surface of the base and configured to provide a layer of insulation between the base and any components situated over the base and/or fixed to the base.

The one or more pipes may comprise a labyrinthine pipe or pipes, which may increase the surface area coverage of the pipes across the base.

The one or more pipes may extend from an outlet of the first passage located in the surface of the base to an inlet of the second passage located in the surface of the base. The inlet and outlet portions of the one or more pipes may extend into or onto the surface of the base. However, it will be appreciated that the majority (e.g., over 90% of the pipes may form the substantially flat layer of piping referred to above.

The one or more pipes (e.g., the portion comprising the substantially flat layer) may extend substantially parallel to the surface of the base. For example, the longitudinal axis of the one or more pipes in this portion may remain substantially parallel to the surface of the base.

The one or more pipes may extend over at least 30%, or even 50% of the surface area of the surface of the base, to maximise the cooling ability thereof.

The one or more pipes may be a single pipe fluidly connected between the first passage and the second passage. Using a single pipe may simplify the construction of the heat exchanger.

The one or more pipes may be located at least above the supply port. This is commonly where the high heat fluid is passing through the base, and so locating the one or more pipes at least above this feature leads to improved cooling as described herein.

In accordance with an aspect of the invention there is provided a pneumatic servovalve comprising a heat exchanger system as described in any of the above embodiments.

The pneumatic servovalve may comprise a torque motor located over a surface of the base, wherein the one or more pipes are located between one or more components of the torque motor and the base. The torque motor may be fixed to the surface of the base (e.g., using one or more fasteners).

The one or more pipes may be located between one or more components of the torque motor and the base. For example, the one or more pipes may be located at least between a permanent magnet of the torque motor and the base. In a further refinement, the one or more pipes may be located at least between the portion of the base comprising the supply port and a permanent magnet of the torque motor.

Any aspect or embodiment of a heat exchanger system or pneumatic servovalve as described above may further comprise a layer of thermally insulating material located over (e.g., adjacent to and/or on) the surface of the base. This has been found to further decrease heat transfer from the base to the components of a torque motor positioned thereon.

This aspect of the disclosure is considered to achieve technical effects in its own right, and may be claimed independently, such that according to an aspect of the disclosure there is provided a pneumatic servovalve. The servovalve includes: a base comprising a supply port in fluid communication with a return port, a first passage for fluid connection to a source of cooling fluid, and a second passage in fluid communication with the return port; a torque motor located over a surface of the base; and a layer of thermally insulating material located over (e.g., adjacent to and/or on) the surface of the base to thermally insulate one or more components of the torque motor from the base.

In any of the aspects or embodiments including the layer of thermally insulating material, the layer of thermally insulating material may be configured to rest against a permanent magnet of the torque motor, and/or may be configured to plug one or more gaps (e.g., air gaps) between the components of the torque motor and the base. The layer of thermally insulating material may comprise or consist of mineral wool, for example ceramic fibre wool.

Additionally, or alternatively, a heat exchanger system or pneumatic servovalve as described above in any aspect or embodiment may further comprise one or more ceramic spacers located on the surface of the base and configured to support one or more components of a torque motor thereon.

This aspect of the disclosure is considered to achieve technical effects in its own right, and may be claimed independently, such that according to an aspect of the disclosure there is provided a pneumatic servovalve. The servovalve includes: a base comprising a supply port in fluid communication with a return port, a first passage for fluid connection to a source of cooling fluid, and a second passage in fluid communication with the return port; a torque motor located over a surface of the base, wherein the torque motor is fastened to the base using one or more fasteners; and one or more ceramic columns, each configured to surround a respective one of the fasteners.

In any of the aspects or embodiments including the ceramic columns, the ceramic columns may comprise tubular members that each fit tightly around a portion of a respective fastener. Each ceramic column may be configured to support a component of the torque motor (e.g., a lower permanent magnet and/or pole piece) thereof.

In accordance with an aspect of the disclosure, there is provided a method of using a heat exchanger system or pneumatic servovalve as described above, in any aspect or embodiment, wherein the method comprises passing a cooling fluid through the one or more pipes such that cooling fluid flows from the first passage to the second passage via the one or more pipes.

BRIEF DESCRIPTION OF THE DRAWINGS

Various embodiments will now be described, by way of example only, and with reference to the accompanying drawings in which.

DETAILED DESCRIPTION

Herewith will be described various embodiments of a servovalve that comprises various features to assist in cooling the servovalve, and specifically a torque motor thereof to mitigate the effects of heat transfer from the high-temperature pneumatic fluid flowing through the servovalve. The servovalve may be used in any suitable application, for example as a servovalve for controlling aircraft working fluid such as engine bleed air or cabin air conditioning.

Figure 2:
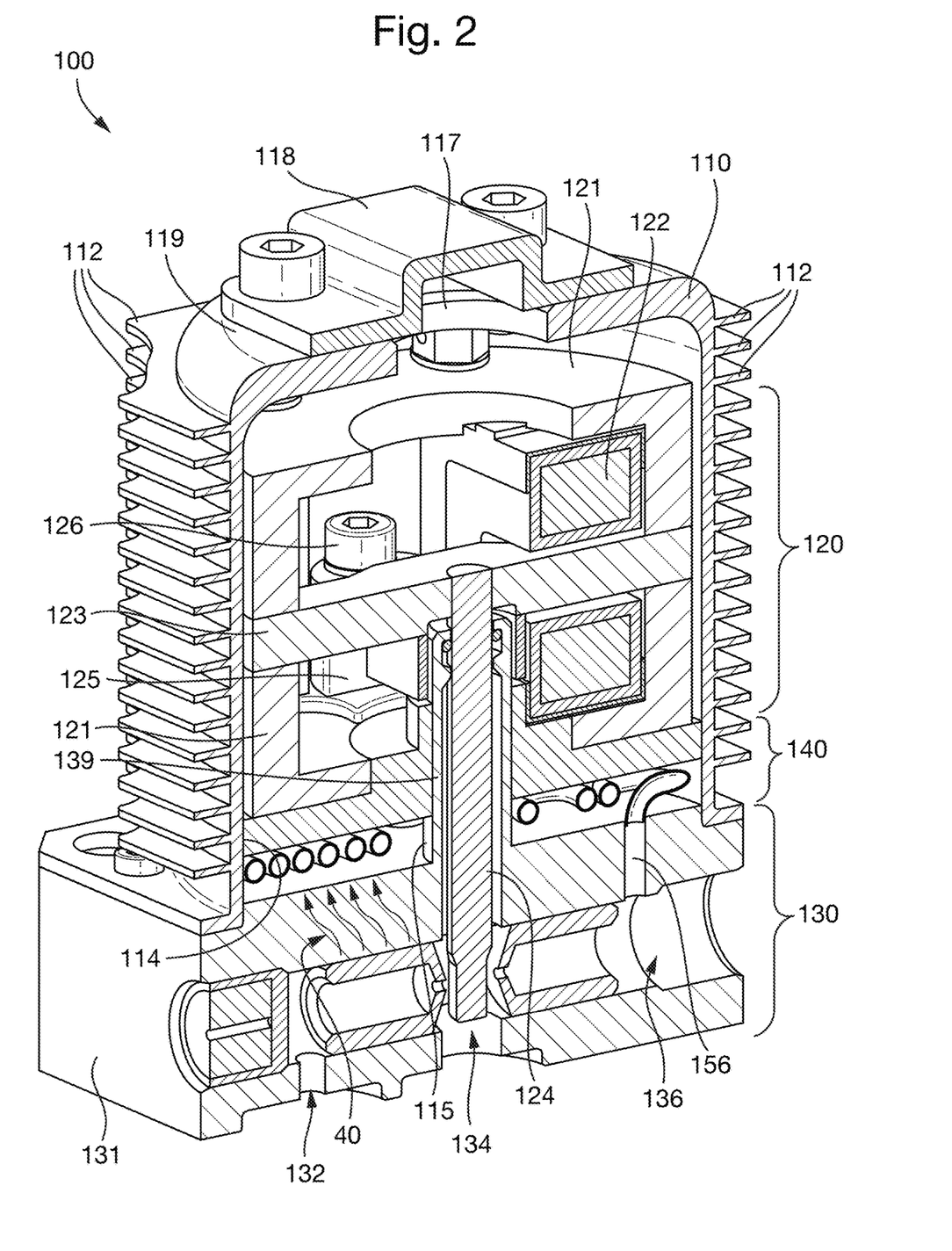
FIG. 2 shows an embodiment of the present disclosure.

FIG. 2 shows a cross-section of a servovalve 100 according to an embodiment of the present disclosure. The servovalve 100 comprises a housing 110, a torque motor 120, a pneumatic section 130 and an insulating section 140.

The torque motor 120 may be a conventional torque motor, comprising upper and lower permanent magnets 121, one or more electromagnetic coils 122, an armature 123, a flapper 124, and a torsion bridge 125. The upper and lower permanent magnets 121 are located either side of the armature 123, and with the electromagnetic coils 122 provide a magnetic circuit that can be manipulated by supplying electrical current to the electromagnetic coils 122. That is, application of an electrical current to the electromagnetic coils 122 may cause the armature 123 to pivot against the action of the torsion bridge 125, which acts to move the armature 123 into its resting position (as shown in FIG. 2). Movement of the armature 123 causes a corresponding movement of the flapper 124, which controls the supply of pneumatic fluid through the servovalve as is known in the art.

The torque motor 120 is contained within the housing 110, which extends over and around the torque motor 120 to protect and isolate the components of the torque motor 120 in use. In the illustrated embodiment the housing 110 comprises a plurality of heat exchanger fins 112 configured to transfer heat from the housing 110 to the external environment. However, in various embodiments the housing 110 may be provided without heat exchanger fins 112.

A cap 118 may be provided, which may be located over a top surface 119 of the housing 110. The cap 118 may be configured to cover an aperture 117 located in the top surface 119 of the housing 110.

The pneumatic section 130 of the servovalve 100 comprises a base 131, which comprises a supply port 132, a control port 134 and a return port 136 for pneumatic fluid. The base 131 may be comprised of aluminium. Movement of the flapper 124 as described above causes the pneumatic fluid (e.g., air) to move through the pneumatic section 130 from the supply port 132 to the return port 136.

As discussed above the pneumatic fluid passing through the supply port 132 is typically relatively hot, and heat may be undesirably transferred from the pneumatic fluid through the base 131 as indicated by arrows 40. In order to mitigate or reduce heat transfer to the torque motor 120 and insulation elements 140 is provided which comprises a number of parts configured to thermally isolate the components of the torque motor 120.

The torque motor 120 may be connected to the base 131 using one or more fasteners 126. The fasteners 126 may extend through part of the torsion bridge 125 and into the base 131 for securement thereto. The fasteners 126 may comprise screws that cooperate with a corresponding screw thread within the base 131.

The base 131 may comprise a central column 139 that extends in a direction towards the torque motor 120, and which may be configured to receive the flapper 124 of the torque motor 120.

Figure 3:
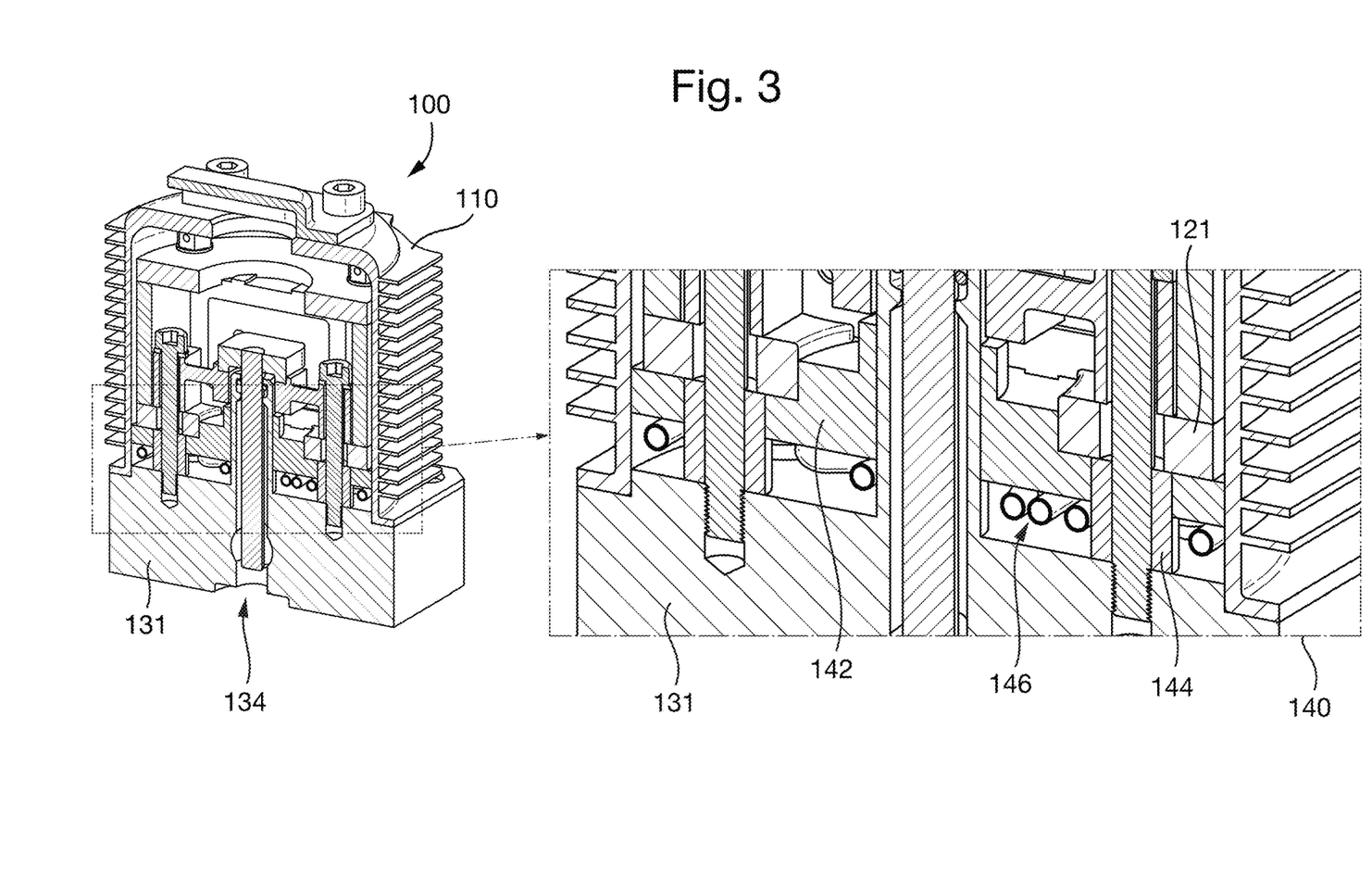
FIG. 3 shows a close-up of part of the embodiment of FIG. 2.

FIG. 3 shows a cross-section of the servovalve 100 oriented at 90 degrees to the cross-section shown in FIG. 2, and showing a close-up of the insulation elements 140.

The insulation elements 140 comprise three elements, any or all of which may be included in the servovalve 100 and various embodiments of the present disclosure in order to thermally isolate the torque motor 120.

A first of the elements is a layer 142 of insulating material, which may comprise mineral wool, for example ceramic fibre wool. The layer 142 of insulating material may extend between an interior surface 114 of the housing 110 and an exterior surface 115 of the central column 139 of the base 131. The layer 142 may be configured to rest against one of the permanent magnets 121 of the torque motor 120, and/or the insulating material in the layer 142 may be configured to plug one or more gaps (e.g., air gaps) between the components of the torque motor 120.

The types of mineral wool that can be used may be fire-resistant mineral wool such as ceramic fibre wool or kaowool. The layer 142 may be formed by sandwiching the mineral wool between aluminium sheets and compressing the sheets together to condense the mineral wool into its desired shape. At this point, the mineral wool may then be inserted into the torque motor during an appropriate stage of construction.

A second of the elements comprises one or more ceramic columns 144, which may be configured to surround the fasteners of the torque motor 120 that secure it to the base 131. Using ceramic columns 144 has been found to provide improved thermal insulation and positioning of the torque motor 120 when providing insulation elements 140 as described herein, as well as providing a high compressive strength. It has been found that combining the first and second elements, namely the layer 142 of insulating material and the ceramic columns 144 lead to improvements in the thermal isolation of the components of the torque motor 120.

A third of the elements comprises a heat exchanger system in the form of a labyrinthine pipe 146 that is located between the torque motor 120 and the base 131 of the servovalve 100. In use a cooling fluid may be transmitted through the pipe 146 such that heat may be transferred from the base 131 of the servovalve 100 to the fluid within the pipe 146, rather than being transferred to the components of the torque motor 120.

Figure 4:
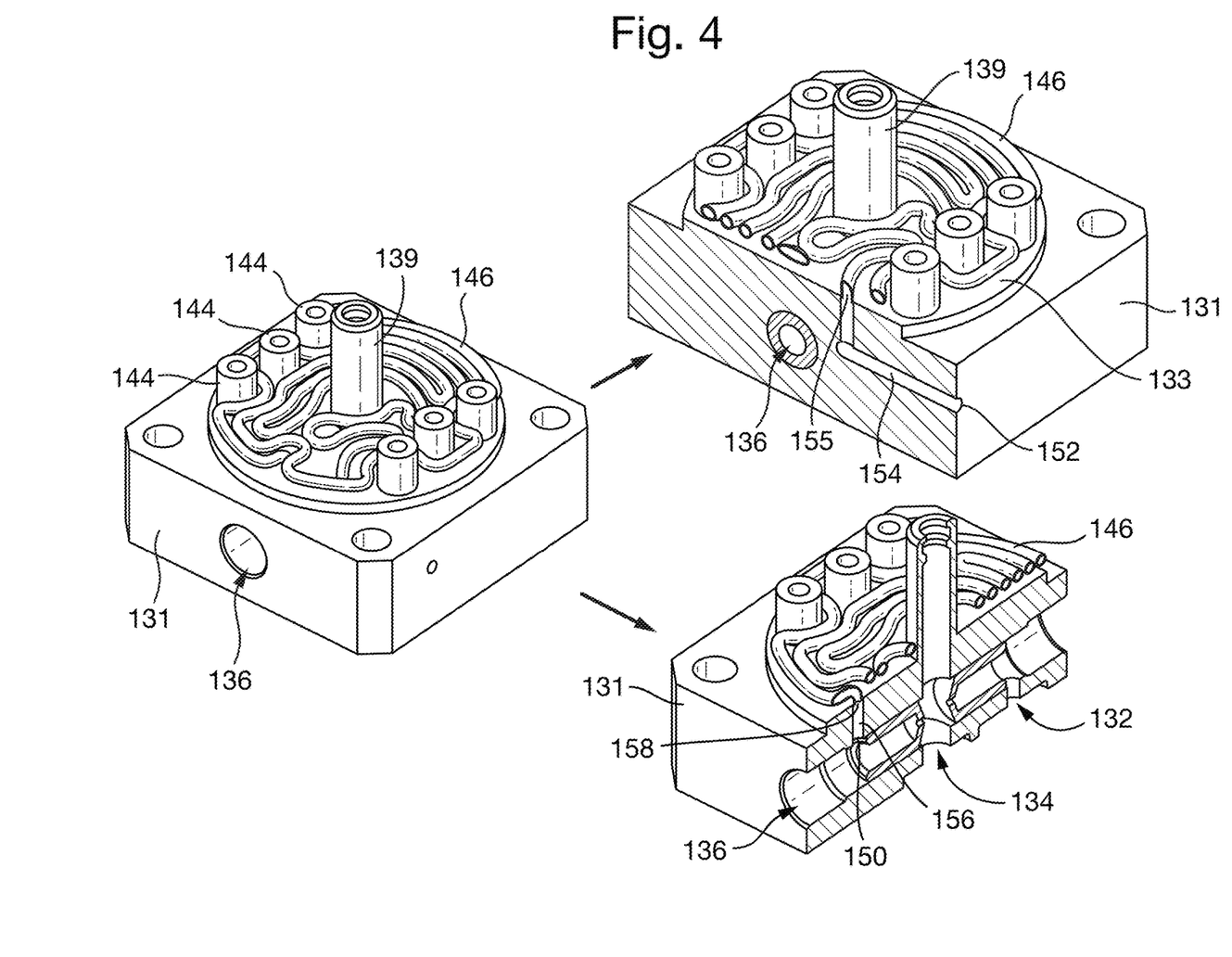
FIG. 4 shows various cross sections of the embodiment of FIG. 2.

FIG. 4 shows the heat exchanger system in more detail, and illustrates the base 131 of the servovalve 100 in isolation with various components of the heat exchanger system, as well as the ceramic columns 144.

The heat exchanger system comprises an inlet 152 that forms the entrance to a first passage 154 within the base 131 of the servovalve 100 the first passage 154 extends from the inlet 152 to an outlet 155 in fluid communication with the pipe 146. The outlet 155 is located in an upper surface 133 of the base 131. In the illustrated embodiment the pipe 146 is formed by a single pipe, but in various embodiments additional pipes may be provided that receive cooling fluid from the first passage 154. For example, the pipe 146 could be replaced by a network of pipes.

The pipe 146 leads to a second passage 156 located within the base 131 which extends from an inlet 158 located in the upper surface 133 of the base 131 to an outlet 150 in fluid communication with the return port 136 of the servovalve 100.

The inlet 152 of the first passage 154 may be in fluid communication with a source of cooling fluid, for example ambient air. The cooling fluid may be drawn through the first passage 154, then the pipe 146 (or network of pipes if applicable) and the second passage 156 by creating suction at the outlet 150 of the second passage 156. This section may be created by any suitable means.

Figure 5:
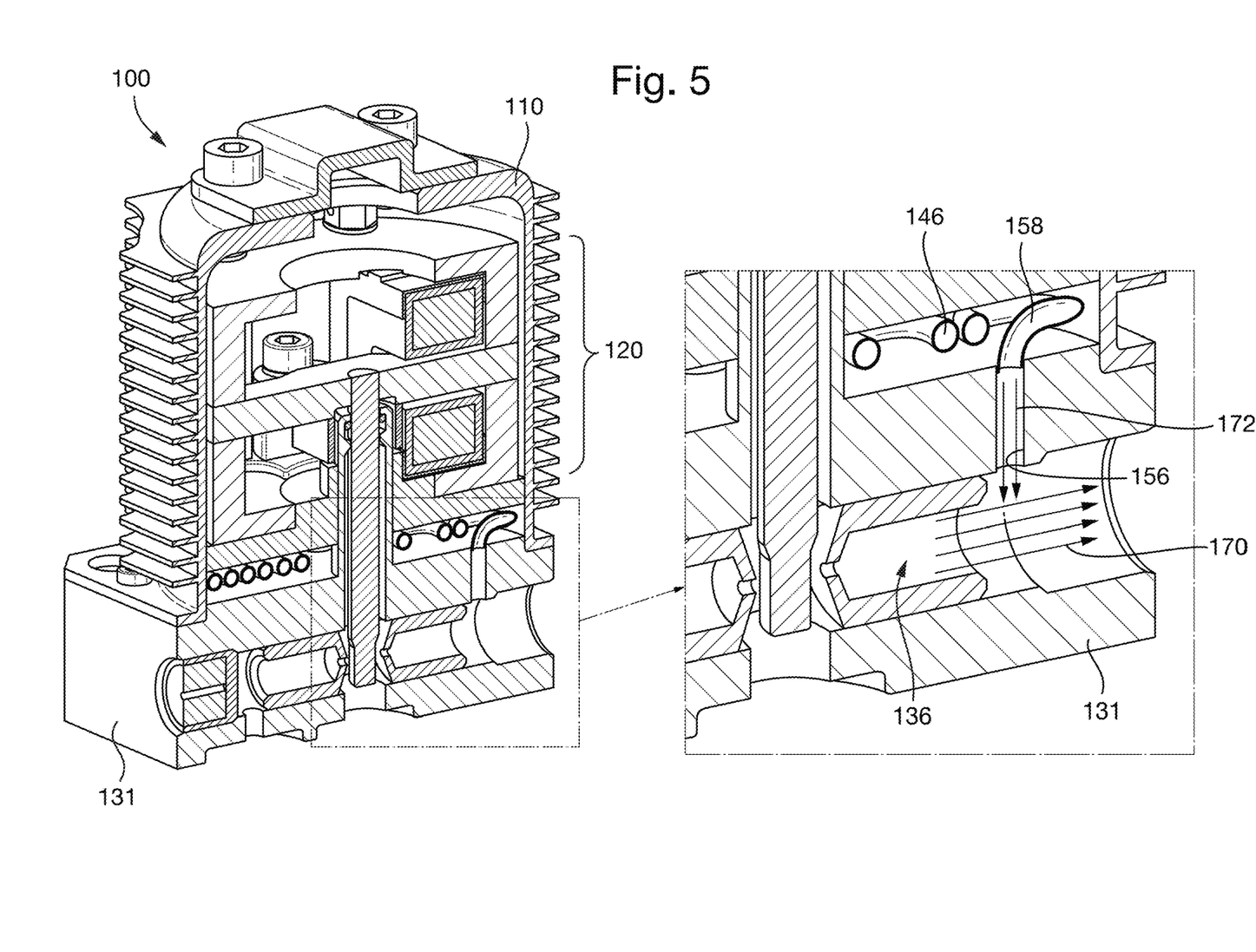
FIG. 5 shows a close-up of the embodiment of FIG. 2 illustrating some features of the embodiment in use.

FIG. 5 illustrates an example of one particular means, which utilises the Venturi effect. That is, the second passage 156 is sized such that, upon activation of the servovalve 100 to transfer pneumatic fluid from the inlet port 132 to the return port 136, fluid passing through the return port 136 in the direction of arrows 170 creates a reduced pressure within the second passage 156. This draws the fluid contained within the second passage 156 and, in turn, the pipe 146 and first passage 154 into the flow of fluid passing through the return port 136 as indicated at arrows 172.

As such, fluid will be transmitted from the source of cooling fluid in fluid communication with the first passage 154 and into the pipe 146 to transfer heat from the base 131 and improve the thermal isolation of the components of the torque motor 120. Using this venturi method, from time to time, for example if the return port 136 is closed, suction will not occur. However, even if there is reduced or no suction, a layer of static cooling air within the pipe 146 may still provide insulation and thermal isolation for the components of the torque motor.

It should be noted that the central column 139 of the base 131 may be the primary cause of heat transfer from the base 131 (e.g., a main body thereof) to the components of the torque motor 120. However, by using one or more of the insulation elements 140 described above, in particular the third element comprising a heat exchanger system and/or the first and second elements in combination, thermal isolation of the torque motor 120 will be improved. The embodiments described herein mean that the torque motor 120 of the servovalve 100 is not exposed to high temperatures, or has less exposure to the high temperature of the pneumatic fluid flowing through the servovalve 100. In addition, the torque motor 120 may stay the same, or substantially similar to those of the prior art whilst incorporating the insulation elements 140 between the torque motor 120 and the base 131 of the servovalve 100. In various embodiments the heat exchanger system may be connected to ambient air as the source of cooling fluid, and the means for drawing the cooling fluid through the heat exchanger system may not require substantial amounts of energy (e.g., using the venturi effect as discussed above).

Figure 6:
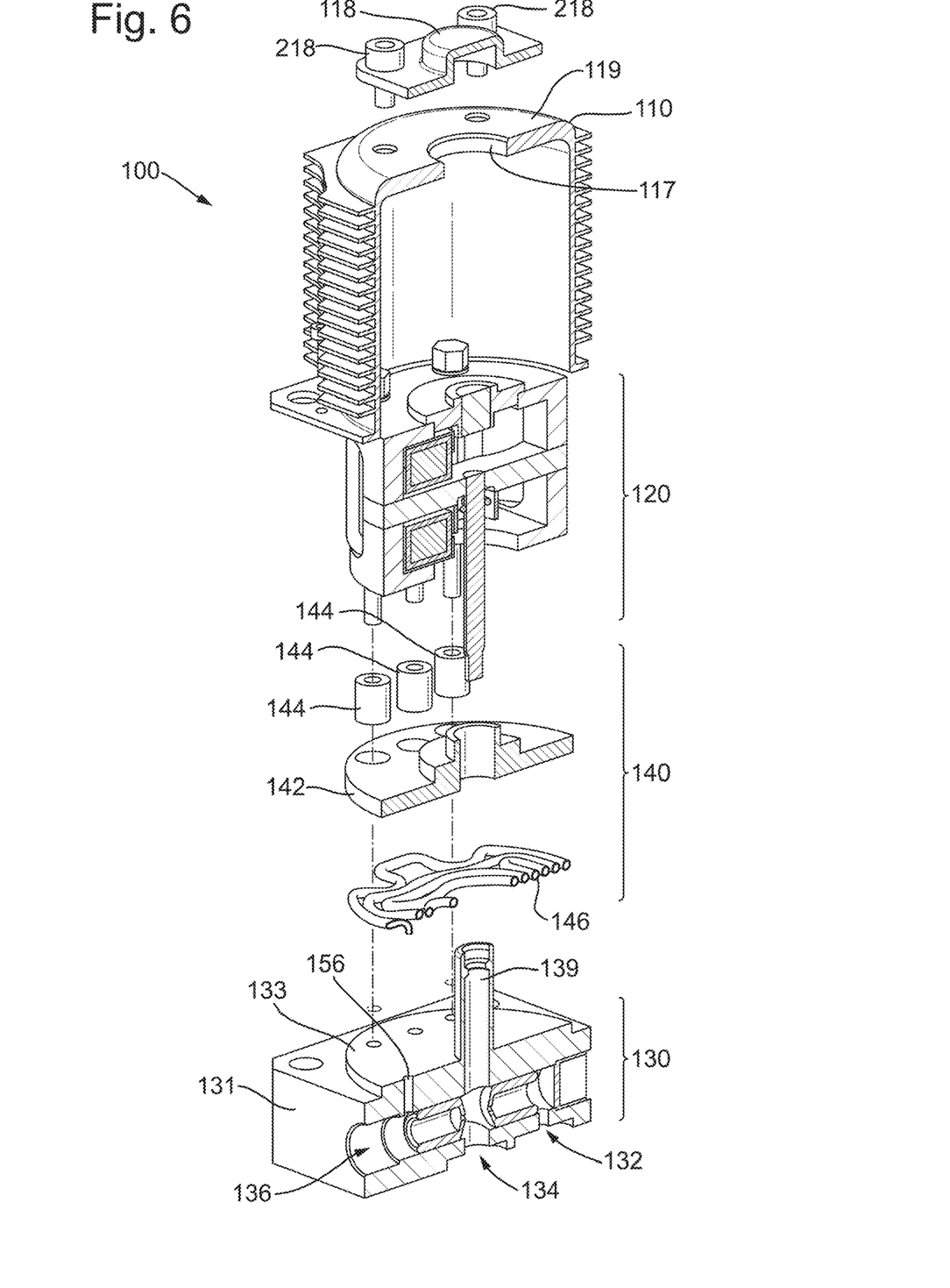
FIG. 6 shows an exploded, cross-sectional view of the embodiment of FIG. 2.

FIG. 6 shows an exploded, cross-sectional view of the servovalve 100, from which it can be seen that the cap 118 may be secured onto the top surface 119 of the housing 110 using one or more fasteners 218. The housing 110 may be located over the torque motor 120 and the insulation elements 140, including the pipe 146 ceramic columns 144 and layer 142 of insulating material. These components then sit on top of the base 131 of the pneumatic section 130, including the supply port 132 control port 134 and return port 136.

Although the present disclosure has been described with reference to various embodiments, it will be understood by those skilled in the art that various changes in form and detail may be made without departing from the scope of the invention as set forth in the accompanying claims.

The invention claimed is:

1. A pneumatic servovalve comprising;
a torque motor; and
a heat exchanger system, the heat exchanger system comprising:
a base comprising a pneumatic fluid supply port in fluid communication with a pneumatic fluid return port to allow a pneumatic fluid leaving the pneumatic fluid supply port to flow through the pneumatic fluid return port, a first passage for fluid connection to a source of a cooling fluid, and a second passage in fluid communication with the pneumatic fluid return port; and
one or more pipes located adjacent a surface of the base, the one or more pipes fluidly connected between the first passage and the second passage, such that in use the cooling fluid is configured to flow from the first passage to the second passage via the one or more pipes to be combined with the pneumatic fluid flowing through the pneumatic fluid return port, wherein the torque motor is located over the surface of the base, and the one or more pipes are located between one or more components of the torque motor and the base.

2. The pneumatic servovalve as claimed in claim 1, wherein the one or more pipes comprise a labyrinthine pipe or pipes.

3. The pneumatic servovalve as claimed in claim 1, wherein the one or more pipes extend from an outlet of the first passage located in the surface of the base to an inlet of the second passage located in the surface of the base.

4. The pneumatic servovalve as claimed in claim 1, wherein the one or more pipes extend parallel to the surface of the base.

5. The pneumatic servovalve as claimed in claim 1, wherein the one or more pipes extend over at least 30% of the surface area of the surface of the base.

6. The pneumatic servovalve as claimed in claim 5, wherein the one or more pipes extend over at least 50% of the surface area of the surface of the base.

7. The pneumatic servovalve as claimed in claim 1, wherein the one or more pipes is a single pipe fluidly connected between the first passage and the second passage.

8. The pneumatic servovalve as claimed in claim 1, wherein the one or more pipes are located at least above the pneumatic fluid supply port.

9. The pneumatic servovalve as claimed in claim 1, wherein the one or more pipes are located between a permanent magnet of the torque motor and the base.

10. The pneumatic servovalve as claimed in claim 1, further comprising a layer of thermally insulating material located over the surface of the base.

11. The pneumatic servovalve as claimed in claim 1, further comprising one or more ceramic spacers located on the surface of the base and configured to support the one or more components of the torque motor thereon.

12. A method of using the pneumatic servovalve as claimed in claim 1, the method comprising: passing the cooling fluid through the one or more pipes such that the cooling fluid flows from the first passage to the second passage via the one or more pipes.

* * * * *